United States Patent [19]

Tomic et al.

[11] Patent Number: 5,599,415
[45] Date of Patent: Feb. 4, 1997

[54] METHOD OF THERMALLY SPLICING ZIPPERS

[75] Inventors: Mladomir Tomic, Appleton; Gregory L. Petkovsek, Menasha, both of Wis.

[73] Assignee: Reynolds Consumer Products Inc., Appleton, Wis.

[21] Appl. No.: 501,194

[22] Filed: Jul. 11, 1995

[51] Int. Cl.⁶ .......................... A44B 19/16; B65H 69/06
[52] U.S. Cl. ................. 156/159; 156/157; 156/304.2; 156/304.5; 156/304.6; 24/399; 24/587; 242/553; 383/63
[58] Field of Search .................. 156/157, 159, 156/304.2, 304.5, 304.6; 242/553, 555, 555.1, 555.3; 206/810; 425/814; 383/63; 24/30.5 L, 399, 400, 587

[56] References Cited

U.S. PATENT DOCUMENTS

| | | | |
|---|---|---|---|
| 2,495,761 | 1/1950 | Platt | 154/116 |
| 3,331,719 | 7/1967 | Soloff | 156/73 |
| 3,486,964 | 12/1969 | Brunlid | 161/38 |
| 3,874,968 | 4/1975 | Robinson | 156/154 |
| 3,919,034 | 11/1975 | Carini | 156/304.5 |
| 4,009,065 | 2/1977 | Mikulas | 156/159 |
| 4,110,142 | 8/1978 | Tall | 156/159 |
| 4,379,114 | 4/1983 | Fujiki et al. | 264/248 |
| 4,496,412 | 1/1985 | Ritter | 156/157 |
| 4,564,543 | 1/1986 | Ritter | 428/58 |
| 4,668,333 | 5/1987 | Tandon et al. | 156/304.5 X |
| 4,914,793 | 4/1990 | Rampolia et al. | 156/157 X |
| 5,152,613 | 10/1992 | Herrington, Jr. | 383/63 |
| 5,232,529 | 8/1993 | Miyake | 156/73.4 |
| 5,320,698 | 6/1994 | Fournier et al. | 156/159 |
| 5,350,472 | 9/1994 | Koblella | 156/157 |

*Primary Examiner*—Mark A. Osele
*Attorney, Agent, or Firm*—Alan T. McDonald

[57] ABSTRACT

A method of thermally splicing a first zipper to a second zipper, and the thermally formed splice produced by this method, are provided. The first and second zippers each include a male profile and a female profile adapted to interlock with each other. The splice is prepared by thermally fusing an end section of the male profile of the first zipper to an end section of the male profile of the second zipper and thermally fusing an end section of the female profile of the first zipper to an end section of the female profile of the second zipper. Alternatively, the splice can be prepared by thermally fusing the end sections of two closed zippers. The male profile of each zipper includes a male locking member, and the female profile of each zipper includes a female locking member. To provide substantial continuity between the male locking members of the first and second zippers and between the female locking members of the first and second zippers, a notch is formed in the end section of the male profile of the first zipper and the end section of the female profile of one of the first and second zippers prior to thermally fusing the end sections of the two zippers.

26 Claims, 4 Drawing Sheets

METHOD OF THERMALLY SPLICING ZIPPERS

FIELD OF THE INVENTION

The present invention generally relates to a method of thermally splicing together two reclosable zippers, and the splice made by the method. In particular, this invention relates to thermally splicing two zippers together with or without the formation of a notch in one of the zippers.

BACKGROUND OF THE INVENTION

Recloseable zippers are used widely in the food packaging industry for providing packages that can be repeatedly opened and closed. These zippers typically provide two locking members: a male locking member and a female locking member. The locking members are designed to interlock under pressure and to disengage when the male and female members are pulled apart. To facilitate the alignment of the male and female locking members during reclosure, a post can also be provided.

In some applications, the zippers are formed integrally with the package (bag), while in other applications, the zippers are formed separately and are subsequently sealed to the package material. When the zipper is not formed integrally with the package, the zipper comprises a male profile and a female profile. The male locking member of the zipper is provided by the male profile and the female locking member of the zipper is provided by the female profile. In addition, the male and female profiles can each provide fusible ribs which can be used to fuse the zipper to the bag material.

In the bag manufacturing process, a continuous zipper wound about a spool is unwound from the spool and brought together with bag material. The supplied zipper and the bag material are then thermally fused together. In this manufacturing process, as the zipper from the spool runs out, the end of the zipper from the spool must be spliced to the end of a continuous zipper wound about a second spool so that the manufacturing process can continue without interruption.

One current method of splicing two zippers together involves manually taping the end of the zipper on one spool to the beginning of the zipper on the second spool. There are several disadvantages to using tape to splice zippers together. The tape splicing operation generates a large amount of scrap because the tape splice is fairly large in size and the zipper must be marked before and after the splice. Numerous bags must be thrown out when tape is used to splice the zippers together. Furthermore, because tape is used to splice the zippers together, the bags that are thrown out are non-recyclable. In addition, the manual tape splicing operation is time-consuming and, as a result, it decreases the efficiency and productivity of the bag manufacturing process. Thus, there is a need for a method of splicing two zippers together without the use of tape.

BRIEF SUMMARY OF THE INVENTION

In one embodiment, the present invention provides a method of thermally splicing a first zipper to a second zipper. The zippers contemplated by the present invention provide (1) a male profile having a male locking member and a base supporting the male locking member and (2) a female profile having a female locking member and a base supporting the female locking member. The male and female locking members are designed to interlock with each other under pressure and then disengage when pulled apart. In this method, an end section of the male profile of the first zipper and an end section of the male profile of the second zipper are overlapped. Similarly, an end section of the female profile of the first zipper and an end section of the female profile of the second zipper are overlapped. The overlapped end sections of the zippers are then thermally fused to thermally splice the first zipper to the second zipper.

In another embodiment, the male locking member and the base of the male profile of either the first or second zipper at the end section thereof is removed to form a first notch. Similarly, a second notch is formed by removing the female locking member and the base of the female profile of either the first or second zipper at the end section thereof. After forming the first and second notches, the end sections are overlapped so that the male locking member of the first zipper is generally in line with the male locking member of the second zipper. The overlapped sections are then thermally fused to form the splice.

Yet another embodiment provides a method of thermally splicing a first zipper to a second zipper in which the first and second zippers both remain interlocked. The method comprises overlapping an end section of the first zipper and an end section of the second zipper and thermally fusing the overlapping sections.

A further embodiment provides a method of thermally fusing two zippers together in which a portion of the interlocked male and female profiles of the first zipper is removed to form a notch. In this embodiment, when the end sections of the two zippers are overlapped, they are overlapped to align the notch and the second zipper so that the interlocked male and female profiles of the first zipper are generally in line with the interlocked male and female profiles of the second zipper.

In yet another embodiment, the present invention provides a thermally formed splice of a first zipper and a second zipper produced by the methods described above.

BRIEF DESCRIPTION OF THE DRAWINGS

Other objects and advantages of the invention will become apparent upon reading the following detailed description and upon reference to the drawings in which.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1A:
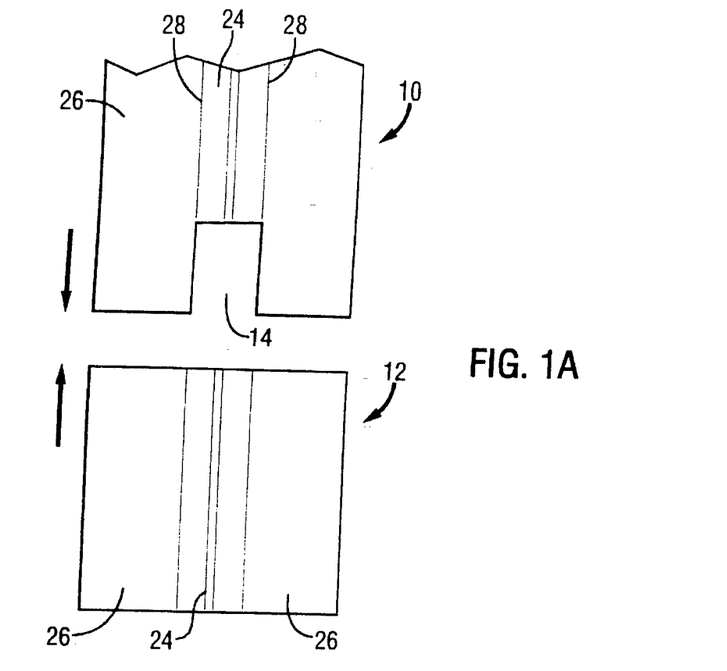
FIG. 1A is a plan view of two zippers prior to thermally splicing the zippers together.
Figure 1B:
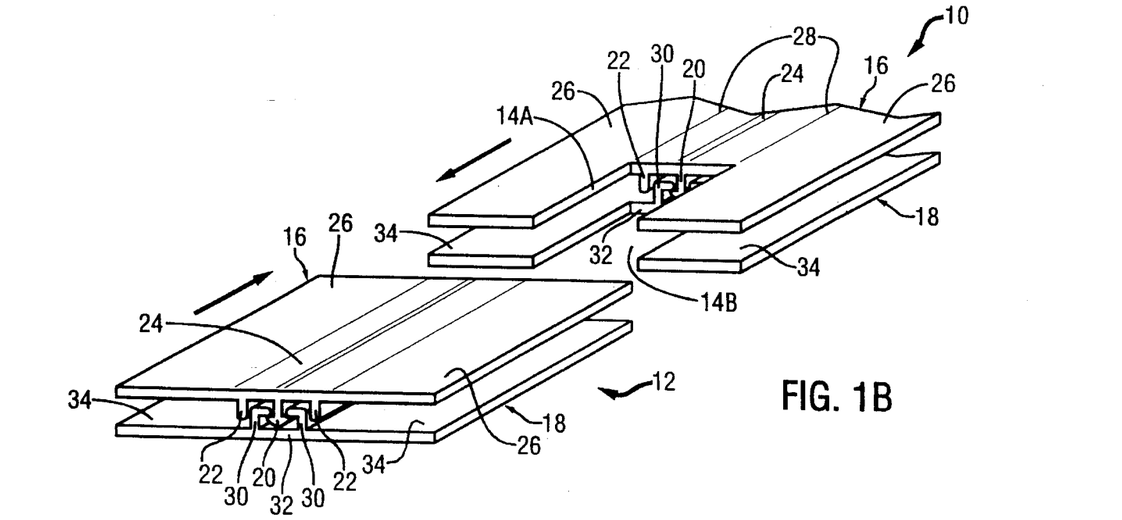
FIG. 1B is a perspective view of the two zippers in FIG. 1A prior to thermally splicing the zippers together.
Figure 1C:
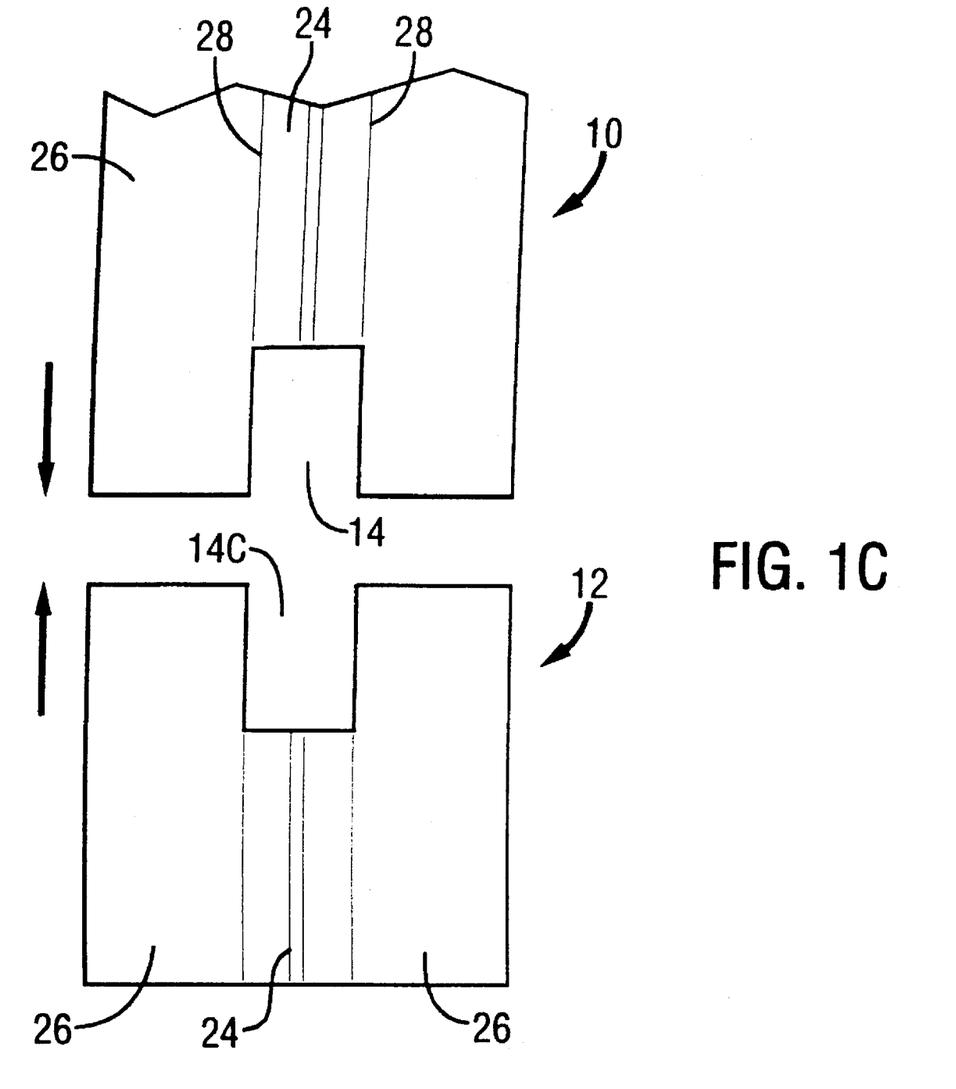
FIG. 1C is a plan view of another embodiment of two zippers prior to thermally splicing the zippers together.
Figure 2A:
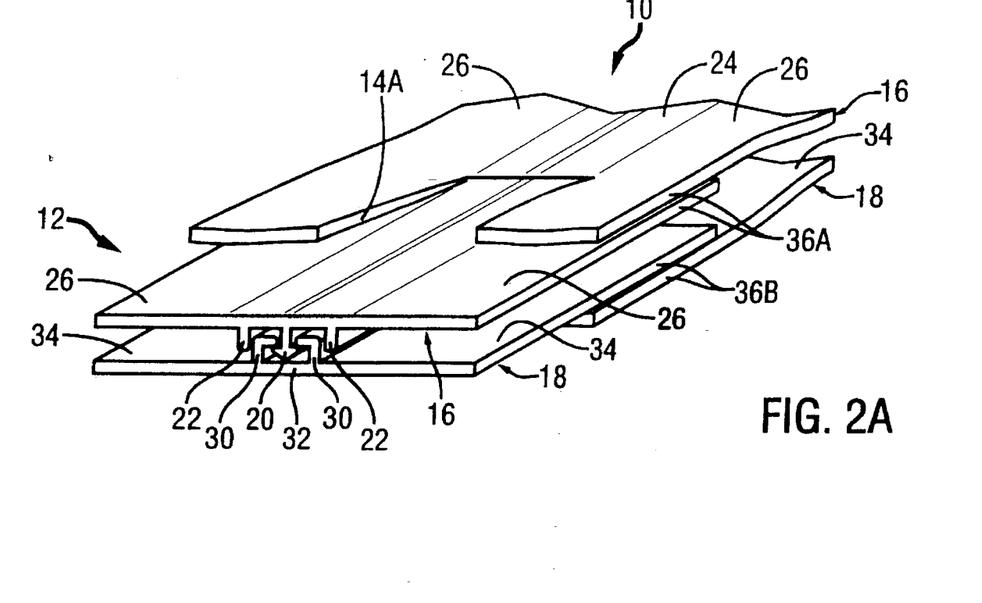
FIG. 2A is a perspective view of two overlapping zippers in which the male and female profiles of one zipper are overlapped with the respective male and female profiles of the second zipper, and in which a notch is formed in one of the zippers.
Figure 2B:
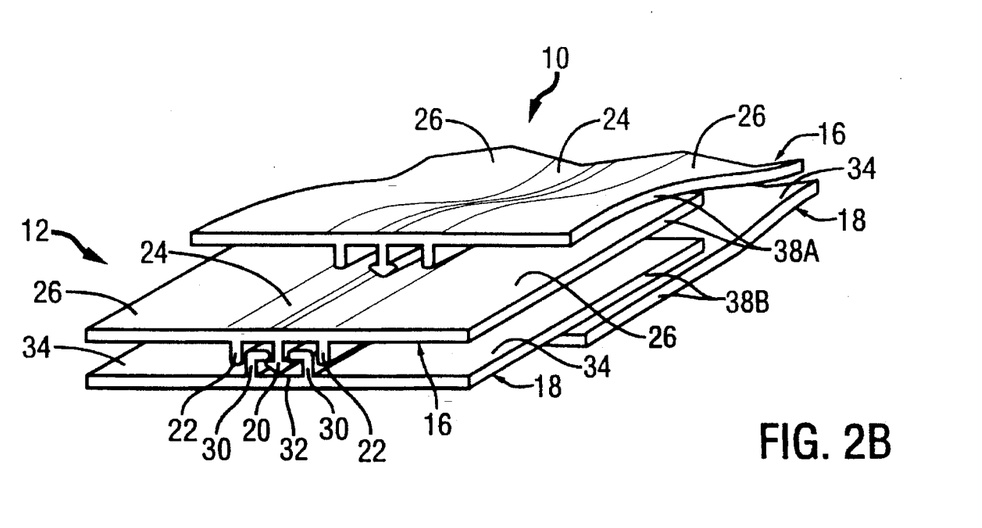
FIG. 2B is a perspective view of the two overlapped zippers in FIG. 2A excluding the notch.
Figure 3A:
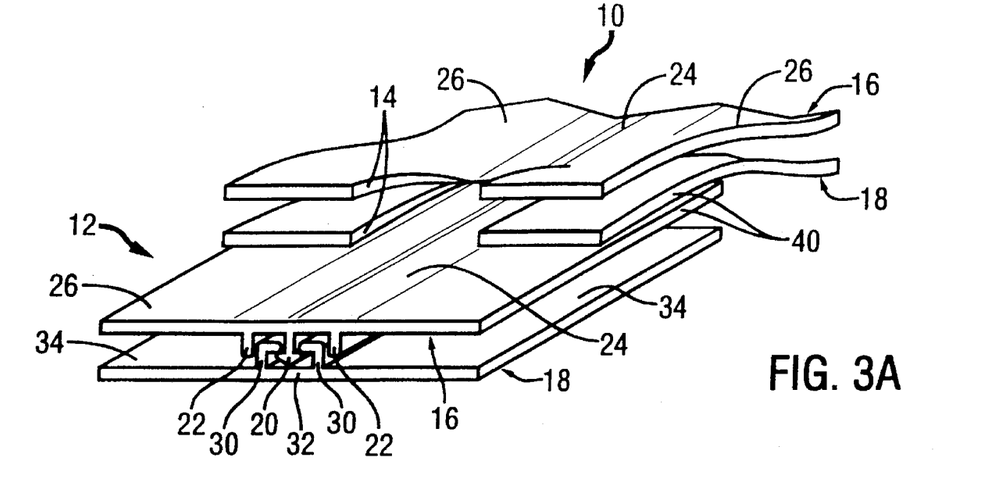
FIG. 3A is a perspective view of two overlapped zippers in which the two zippers remain in the closed position and in which a notch is formed in one of the zippers.
Figure 3B:
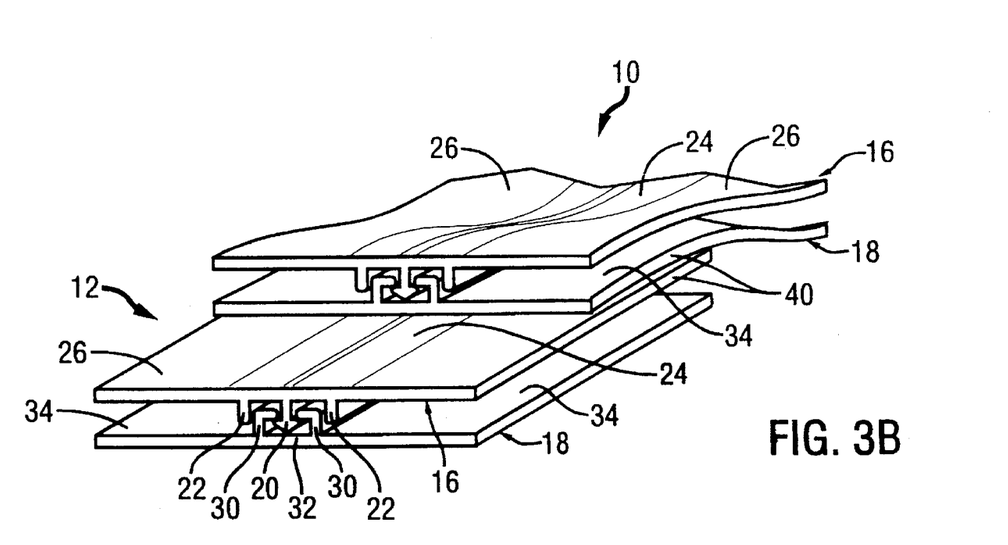
FIG. 3B is a perspective view of the two overlapped zippers in FIG. 3A excluding the notch.

The present invention provides a method of thermally splicing a first zipper to a second zipper during spool changeover in the bag manufacturing process, and the thermally formed splice prepared by this method. Turning now to the drawings, FIGS. 1–3 illustrate the thermal fusing of two zippers. FIG. 1A shows a plan view of zipper 10 and zipper 12 prior to overlapping and thermally fusing the zipper 10 and the zipper 12 together. FIG. 1A also shows a notch 14 formed in the zipper 10. FIG. 1B shows a perspective view of the zipper 10 and the zipper 12 prior to overlapping and thermally fusing the zipper 10 and the zipper 12.

Each of the zippers 10 and 12 includes a male profile 16 and a female profile 18. The male profile 16 includes a male locking member 20, adjacent posts 22, and a web consisting of a base 24 and a pair of adjacent flanges 26. The male locking member 20 and the posts 22 are integrally formed with and extend inwardly from the base 24. The base 24 is disposed between the flanges 26, and the boundaries of the base 24 are defined by lines 28. Similarly, the female profile 18 includes a pair of female locking members 30 and a web consisting of a base 32 and a pair of adjacent flanges 34. The female locking members 30 are integrally formed with and extend inwardly from the base 32, which is disposed between the flanges 34. The female locking members 30 form a groove therebetween for receiving the male locking member 20.

In FIG. 1B, the male profile 16 and the female profile 18 are depicted in an interlocked position. In this interlocked position, hooks formed by the female locking members 30 releasably engage an expanded head formed by the male locking member 20 to maintain the male locking member 20 in the groove formed between the female locking members 30.

FIG. 1B depicts a first notch 14A prepared by removing the male locking member 20, the posts 22, and the base 24 of the male profile 16 of the zipper 10 at an end section thereof. Similarly, a second notch 14B is prepared by removing the female locking members 30 and the base 32 of the female profile 18 of the zipper 10 at an end section thereof. When the first notch 14A and the second notch 14B are prepared on the same zipper, the notch 14 in FIG. 1A is provided. Alternatively, one of the notches may be prepared in the zipper 10 while the other of the notches is prepared in the zipper 12. The notches 14A and 14B illustrated in FIG. 1B are preferably aligned with each other and have substantially the same width and depth.

FIG. 2A depicts the overlap of the zipper 10 and the zipper 12 in which the male profile 16 and the female profile 18 of the zipper 10 are disengaged from each other prior to overlapping and thermally fusing the zippers 10 and 12 together. After disengaging the male and female profiles 16 and 18 of the zipper 10, an end section of the male profile 16 of the zipper 10 is overlapped with an end section of the male profile 16 of the zipper 12 to form overlapping end sections 36A. The length of overlap is substantially equal to the depth of the notch 14A so that the base of the notch 14A abuts the transverse edge of the base 24 of the male profile 16 of the zipper 12. Similarly, an end section of the female profile 18 of the zipper 10 is overlapped with an end section of the female profile 18 of the zipper 12 to form overlapping end sections 36B. The length of overlap is substantially equal to the depth of the notch 14B so that the base of the notch 14B abuts the transverse edge of the base 32 of the female profile 18 of the zipper 12. The overlapping end sections 36A and 36B are selected to be of sufficient length to form a strong thermal splice.

When the zipper 10 and the zipper 12 are overlapped, they are overlapped to align the first notch 14A with the base 24 of the zipper 12 so that the male locking member 20 and posts 22 of the zipper 12 at the end section thereof are generally in line with and abutting the respective male locking member 20 and posts 22 of the zipper 10. Similarly, the second notch 14B is aligned with the base 32 of the zipper 12 so that the female locking members 30 of the zipper 12 at the end section thereof are generally in line with and abutting the respective female locking members 30 of the zipper 10.

Next, the overlapping end sections 36A are thermally fused together and the overlapping end sections 36B are thermally fused together to form the thermal splice of the zipper 10 and the zipper 12. A significant advantage of thermally fusing together the zippers 10 and 12, while the male and female profiles 16 and 18 of the zipper 10 are disengaged, is that the splice formed by thermally fusing each of the overlapping end sections 36A and 36B produces a contiguous zipper from the zippers 10 and 12. The contiguous zipper is the result of thermally fusing the end of one zipper to the beginning of the second zipper. The notch 14A provides continuity between the male locking member 20 and posts 22 of the zipper 10 and the respective male locking member 20 and posts 22 of the zipper 12. Similarly, the notch 14B provides continuity between the female locking members 30 of the zipper 10 and the respective female locking members 30 of the zipper 12. The contiguous zipper provided by thermally splicing together the zipper 10 and the zipper 12 can be repeatedly opened and closed during the bag manufacturing process.

In FIG. 2A, the overlap of the zippers 10 and 12 is shown where the male and female profiles 16 and 18 of the zipper 10 are disengaged. The overlapping end sections 36A and 36B of the zippers 10 and 12 are the areas which are thermally fused. Thermal fusion is accomplished by concurrently subjecting the overlapping end sections 36A and 36B to a thermal source such as a heat source or an ultrasonic source. The energy provided by the thermal source fuses each of the overlapping end sections 36A and 36B together to form the splice. In this embodiment, the thermal fusion step must be performed with care so as not to fuse the male profile 16 of the zipper 12 to the female profile 18 of the zipper 12. If the male profile 16 of the zipper 12 and the female profile 18 of the zipper 12 were to be fused together, the fused area would no longer be disengagable at the thermal splice. There should be provided only enough energy to thermally fuse the male profile 16 of the zipper 10 to the male profile 16 of the zipper 12 and to thermally fuse the female profile 18 of the zipper 10 to the female profile 18 of the zipper 12. In the thermal fusion of each of the overlapping end sections 36A and 36B, preferably only the flanges 26 of the male profiles 16 of the respective zippers 10 and 12 are fused together and only the flanges 34 of the female profiles 18 of the respective zippers 10 and 12 are fused together.

In an alternative embodiment, the male and female profiles 16 and 18 of the zipper 12 are disengaged from each other, and thermal splicing is carried out on the male profiles 16 of the respective zippers 10 and 12 separately from the female profiles 18 of the respective zippers 10 and 12. In this embodiment, the overlapping end sections 36A and the overlapping end sections 36B are separately subjected to a thermal source.

FIG. 2A shows that the first notch 14A of the zipper 10 is prepared by removing the male locking member 20, the posts 22, and the base 24 of the male profile 16 of the zipper 10 at the end section thereof. It is, however, not necessary that the adjacent posts 22 be removed to prepare the first notch 14A. Rather, the notch 14A may be limited to removal of the male locking member 20 and a narrow portion of the base 24 directly supporting the male locking member 20. In similar fashion, to prepare the second notch 14B of the zipper 10, the female locking members 30 and the base 32 of the female profile 18 of the zipper 10 at the end section thereof are removed.

A significant advantage of forming the notches 14A and 14B is that the splice formed by the overlapping end-sections 36A and 36B is approximately the same thickness or only slightly thicker than the thickness of a single zipper (FIG. 2A). A thermally formed splice without formation of the notches 14A and 14B provides a splice that is about twice as thick as a single zipper, as shown in FIG. 2B. A thinner splice (FIG. 2A) is advantageous in that the machines used in joining the zipper to bag material in the bag manufacturing process do not have to process thermal splices that are the thickness of two zippers. A thicker splice (FIG. 2B), however, can be manufactured more easily and quickly.

While FIG. 2A illustrates both of the notches 14A and 14B being formed in the zipper 10, one of the notches 14A and 14B can be formed in the zipper 12 rather than in the zipper 10. If, for example, the notch 14B is formed in the zipper 12 instead of the zipper 10, the steps of overlapping and thermally fusing the zipper 10 and the zipper 12 are performed analogously as described with the exception that the female profile 18 of the zipper 10 would be above, not below, the female profile 18 of the zipper 12 (as viewed in FIG. 2A).

The notches 14A and 14B in the zipper 10 are preferably formed manually with a cutting tool or automatically with a mechanical cutting device during spool change-over. The notch 14A is formed by cutting the end section of the male profile 16 of the zipper 10 to remove the male locking member 20, the posts 22, and the base 24. Similarly, the notch 14B is formed by cutting the end section of the female profile 18 of the zipper 10 to remove the female locking members 30 and the base 32. Alternatively, the notches 14A and 14B can be pre-formed at one end of the zipper 10 during the extrusion process used to manufacture the zipper 10.

In the embodiment depicted in FIG. 2B, the male and female profiles 16 and 18 of the zipper 10 are not partially cut away to form notches therein. Since the notches are not prepared, the overlapping end sections 38A and 38B produce a splice that is approximately the thickness of two zippers. While this embodiment produces a thicker splice than the splice depicted in FIG. 2A, this splice can be prepared more easily and quickly than the splice in FIG. 2A because the notches 14A and 14B need not be prepared. The thermal splice formed by overlapping the disengaged zippers 10 and 12 as depicted in FIG. 2B produces a thermal splice that can be opened and closed during the bag manufacturing process. As discussed above, during the thermal fusion step, there should be provided only enough energy to thermally fuse the male profile 16 of the zipper 10 to the male profile 16 of zipper 12 and to thermally fuse the female profile 18 of the zipper 10 to the female profile 18 of the zipper 12. If the male profile 16 of the zipper 12 were to be thermally fused to the female profile 18 of zipper 12, the spliced zipper could no longer be disengaged at the thermal splice. In the thermal fusion of each of the overlapping end sections 38A and 38B, preferably only the flanges 26 of the male profiles 16 of the respective zippers 10 and 12 are fused together and only the flanges 34 of the female profiles 18 of the respective zippers 10 and 12 are fused together.

Turning now to FIGS. 3A and 3B, this invention further provides a method of thermally fusing a first zipper to a second zipper while the zippers remain in the interlocked (closed) configuration. FIG. 3A shows the overlap of the zipper 10 and the zipper 12 where the notch 14 has been prepared by removing a portion of an end section of the closed zipper 10. The overlapping and abutting sections 40 of the zippers 10 and 12 are thermally fused to form the splice. Thermally fusing the overlapping areas 40 provides a thermally formed splice which cannot be opened and closed during the bag manufacturing process. In some bag manufacturing processes, the ability to open and close the zipper at the splice site is not required or desired. When the ability to open and close the zipper at the splice site is not required, the effort and time to thermally splice together two closed zippers-is less than that required to thermally splice together two disengaged zippers as described above in connection with FIGS. 1 and 2.

In FIG. 3A, when the zipper 10 and the zipper 12 are overlapped, they are overlapped to align the notch 14 in the zipper 10 with the zipper 12 so that the male locking member 20, the posts 22, and the base 24 of the male profile 16 of the zipper 12 at the end thereof are generally in line with and abutting the respective male locking member 20, the posts 22, and the base 24 of the male profile 16 of the zipper 10. Similarly, the notch 14 in the zipper 10 is aligned with the zipper 12 so that the female locking members 30 and the base 32 of the female profile 18 of the zipper 12 at the end thereof are generally in line with and abutting the respective female locking members 30 and the base 32 of the female profile 18 of the zipper 10.

FIG. 3A depicts that the notch 14 of the zipper 10 is prepared by removing the male locking member 20, the posts 22, and the base 24 of the male profile 16 and by removing the female locking members 30 and the base 32 of the female profile 18 of the zipper 10. The notch 14, however, may be made narrower in width to exclude removal of the posts 22. A significant advantage of forming the notch 14 is that the thickness of the splice is approximately the same or only slightly thicker than the thickness of a single zipper. A thermally formed splice without formation of the notch 14 provides a splice that is about twice as thick as a single zipper, as shown in FIG. 3B. As described above, a thinner splice (FIG. 3A) is advantageous in that the machines used in joining the zipper to bag material in the bag manufacturing process do not have to process thermal splices that are the thickness of two zippers.

In the embodiment shown in FIG. 3B, a notch is not formed in either of the zippers 10 and 12. Since a notch is not prepared, the splice is approximately as thick as two zippers. Although this embodiment produces a thicker splice than the splice shown in FIG. 3A, this thermal splice can be manufactured more easily and quickly because the notch need not be prepared.

The thermal splicing method described herein significantly improves the bag manufacturing process. The thermal splicing method is less time-consuming than the tape splicing operation of the prior art and, as a result, the efficiency and productivity of the bag manufacturing process is enhanced. Since the thermal splicing method employs strong chemical bonding as opposed to mechanical (adhesive) bonding, the thermal splices produced thereby are much stronger than tape splices. Furthermore, since the thermal splicing method produces smaller, cleaner splices than can be produced by the tape splicing operation, the thermal splicing method generates less scrap than the tape splicing operation. This scrap is entirely recyclable because it does not contain tape.

While the present invention has been described with reference to several particular embodiments, those skilled in the art will recognize that many changes may be made thereto without departing from the spirit and scope of the present invention. For example, to increase the strength of the thermal splice, a hot melt adhesive can be interposed between overlapping end sections of the zippers prior to thermally fusing these overlapping end sections. The strength of the thermal splice can also be increased by removing a notch from the second zipper. This embodiment is shown in FIG. 1C where a second notch 14C is formed in the second zipper. When the two zippers shown in FIG. 1C are overlapped, the overlapping flange area is increased and therefore increases the strength of the thermally formed splice. Each of these embodiments and obvious variations thereof is contemplated as falling within the spirit and scope of the invention, which is set forth in the following claims.

What is claimed:

1. A method of thermally splicing a first zipper to a second zipper, the first and second zippers each including a male profile and a female profile adapted to interlock with each other, said method comprising the steps of:

overlapping an end section of the male profile of the first zipper and an end section of the male profile of the second zipper;

overlapping an end section of the female profile of the first zipper and an end section of the female profile of the second zipper;

thermally fusing portions of the overlapping end sections of the respective male profile of the first zipper and the male profile of the second zipper; and thermally fusing portions of the overlapping end sections of the respective female profile of the first zipper and the female profile of the second zipper.

2. The method according to claim 1, wherein the male profile of each of the first and second zippers includes a male flange, and wherein the step of thermally fusing portions of the overlapping end sections of the respective male profile of the first zipper and the male profile of the second zipper includes thermally fusing the male flange of the male profile of the first zipper and the male flange of the male profile of the second zipper.

3. The method according to claim 1, wherein the female profile of each of the first and second zippers includes a female flange, and wherein the step of thermally fusing portions of the overlapping end sections of the respective female profile of the first zipper and the female profile of the second zipper includes thermally fusing the female flange of the female profile of the first zipper and the female flange of the female profile of the second zipper.

4. The method according to claim 1, wherein the male profile of each of the first and second zippers includes a male locking member and a base supporting the male locking member; said method further comprising, prior to the step of overlapping the end section of the male profile of the first zipper and the end section of the male profile of the second zipper, the step of removing the male locking member and the base of the male profile of the first zipper at the end section thereof to form a notch in the end section of the male profile of the first zipper.

5. The method according to claim 4, wherein the step of overlapping an end section of the male profile of the first zipper and an end section of the male profile of the second zipper further includes the step of aligning the notch with the male profile of the second zipper so that the male locking member of the male profile of the second zipper at the end section thereof is generally in line with the male locking member of the male profile of the first zipper.

6. The method according to claim 1, wherein the female profile of each of the first and second zippers includes a female locking member and a base supporting the female locking member; said method further comprising, prior to the step of overlapping the end section of the female profile of the first zipper and the end section of the female profile of the second zipper, the step of removing the female locking member and the base of the female profile of the first zipper at the end section thereof to form a notch in the end section of the female profile of the first zipper.

7. The method according to claim 6, wherein the step of overlapping an end section of the female profile of the first zipper and an end section of the female profile of the second zipper further includes the step of aligning the notch with the female profile of the second zipper so that the female locking member of the female profile of the second zipper at the end section thereof is generally in line with the female locking member of the female profile of the first zipper.

8. The method according to claim 1, wherein the male profile of each of the first and second zippers includes a male locking member and a base supporting the male locking member, and wherein the female profile of each of the first and second zippers includes a female locking member and a base supporting the female locking member, said method further comprising the steps of:

prior to the step of overlapping the end section of the male profile of the first zipper and the end section of the male profile of the second zipper, removing the male locking member and the base of the male profile of the first zipper at the end section thereof to form a first notch in the end section of the male profile of the first zipper; and prior to the step of overlapping the end section of the female profile of the first zipper and the end section of the female profile of the second zipper, removing the female locking member and the base of the female profile of one of the first and second zippers at the end section thereof to form a second notch in the end section of the female profile of the one of the first and second zippers.

9. The method according to claim 8, wherein the step of overlapping an end section of the male profile of the first zipper and an end section of the male profile of the second zipper further includes the step of aligning the first notch with the male profile of the second zipper so that the male locking member of the male profile of the second zipper at the end section thereof is generally in line with the male locking member of the male profile of the first zipper; and wherein the step of overlapping an end section of the female profile of the first zipper and an end section of the female profile of the second zipper further includes the step of aligning the second notch with the female profile of the other of the first and second zippers so that the female locking member of the female profile of the second zipper at the end section thereof is generally in line with the female locking member of the female profile of the first zipper.

10. The method according to claim 8, further comprising the steps of:

prior to the step of overlapping the end section of the male profile of the first zipper and the end section of the male profile of the second zipper, removing the male locking member and the base of the male profile of the second zipper at the end section thereof to form a third notch in the end section of the male profile of the second zipper; and prior to the step of overlapping the end section of the female profile of the first zipper and the end section of the female profile of the second zipper, removing the female locking member and the base of the female profile of the other of the first and second zippers at the end section thereof to form a fourth notch in the end section of the female profile of the other of the first and second zippers.

11. A method of thermally splicing a first zipper to a second zipper, said first and second zippers each including interlocked male and female profiles, said method comprising the steps of:

overlapping an end section of the first zipper and an end section of the second zipper; and thermally fusing portions of the overlapping end sections of the respective first and second zippers, wherein prior to the step of overlapping the end section of the first zipper and the end section of the second zipper, the step of removing a portion of the interlocked male and female profiles of the first zipper at the end section thereof to form a notch is performed.

12. The method according to claim 11, wherein the step of overlapping the end section of the first zipper and the end section of the second zipper further includes the step of aligning the notch and the second zipper so that the interlocked male and female profiles of the second zipper at the end section thereof are generally in line with the interlocked male and female profiles of the first zipper.

13. The method according to claim 11, further comprising the step of removing a portion of the interlocked male and female profiles of the second zipper at the end section thereof to form a second notch.

14. A thermally formed splice of a first zipper and a second zipper, the first and second zippers each including a male profile and a female profile adapted to interlock with each other, said thermally formed splice comprising:

an end section of the male profile of the first zipper;

an end section of the male profile of the second zipper overlapping the end section of the male profile of the first zipper, a portion of the end section of the male profile of the second zipper being thermally fused to a portion of the end section of the male profile of the first zipper;

an end section of the female profile of the first zipper; and an end section of the female profile of the second zipper overlapping the end section of the female profile of the first zipper, a portion of the end section of the female profile of the second zipper being thermally fused to a portion of the end section of the female profile of the first zipper.

15. The thermally formed splice of claim 14, wherein the male profile of each of the first and second zippers includes a male flange, the portions of the end sections of the male profiles of the respective first and second zippers including the male flanges of the end sections of the male profiles of the respective first and second zippers.

16. The thermally formed splice of claim 14, wherein the female profile of each of the first and second zippers includes a female flange, the portions of the end sections of the female profiles of the respective first and second zippers including the female flanges of the end sections of the female profiles of the respective first and second zippers.

17. The thermally formed splice of claim 14, wherein the male profile of each of the first and second zippers includes a male locking member and a base supporting the male locking member, and wherein the end section of the male profile of the first zipper includes a notch formed by removing the male locking member and the base of the male profile of the first zipper at the end section thereof.

18. The thermally formed splice of claim 17, wherein the notch is aligned with the male profile of the second zipper such that the male locking member of the male profile of the second zipper at the end section thereof is generally in line with the male locking member of the male profile of the first zipper.

19. The thermally formed splice of claim 14, wherein the female profile of each of the first and second zippers includes a female locking member and a base supporting the female locking member, and wherein the end section of the female profile of the first zipper includes a notch formed by removing the female locking member and the base of the female profile of the first zipper at the end section thereof.

20. The thermally formed splice of claim 19, wherein the notch is aligned with the female profile of the second zipper such that the female locking member of the female profile of the second zipper at the end section thereof is generally in line with the female locking member of the female profile of the first zipper.

21. The thermally formed splice of claim 14, wherein the male profile of each of the first and second zippers includes a male locking member and a base supporting the male locking member, wherein the female profile of each of the first and second zippers includes a female locking member and a base supporting the female locking member, wherein the end section of the male profile of the first zipper includes a first notch formed by removing the male locking member and the base of the male profile of the first zipper at the end section thereof, and wherein the end section of the female profile of one of the first and second zippers includes a second notch formed by removing the female locking member and the base of the female profile of the one of the first and second zippers at the end section thereof.

22. The thermally formed splice of claim 21, wherein the first notch is aligned with the male profile of the second zipper such that the male locking member of the male profile of the second zipper at the end section thereof is generally in line with the male locking member of the male profile of the first zipper, and wherein the second notch is aligned with the female profile of the other of the first and second zippers such that the female locking member of the female profile of the other of the first and second zippers at the end section thereof is generally in line with the female locking member of the female profile of the one of the first and second zippers.

23. The thermally formed splice of claim 21, wherein the end section of the male profile of the second zipper includes a third notch formed by removing the male locking member and the base of the male profile of the second zipper at the end section thereof, and wherein the end section of the female profile of the other of the first and second zippers includes a fourth notch formed by removing the female locking member and the base of the female profile of the other of the first and second zippers at the end section thereof.

24. A thermally formed splice of a first zipper and a second zipper, said first and second zippers each including interlocked male and female profiles, said thermally formed splice comprising:

an end section of the first zipper; and an end section of the second zipper overlapping the end section of the first zipper, a portion of the end section of the second zipper being thermally fused to a portion of the end section of the first zipper; wherein the end section of the first zipper includes a notch formed by removing a portion of the interlocked male and female profiles of the first zipper at the end section thereof.

25. The thermally formed splice of claim 24, wherein the notch is aligned with the second zipper such that the interlocked male and female profiles of the second zipper at the end section thereof are generally in line with the interlocked male and female profiles of the first zipper.

26. The thermally formed splice of claim 24, wherein the end section of the second zipper includes a second notch formed by removing a portion of the interlocked male and female profiles of the second zipper at the end section thereof.

* * * * *